3,448,308
DIRECTIONAL CONTROL SYSTEMS FOR SYNCHRONOUS MOTORS
Richard E. Pervorse, Joseph E. Wiser, John A. Peterson, and Stephen F. Murray, Indianapolis, Ind., assignors to P. R. Mallory & Co., Inc., Indianapolis, Ind., a corporation of Delaware
Filed Sept. 1, 1967, Ser. No. 664,967
Int. Cl. H02k 7/10
U.S. Cl. 310—41    8 Claims

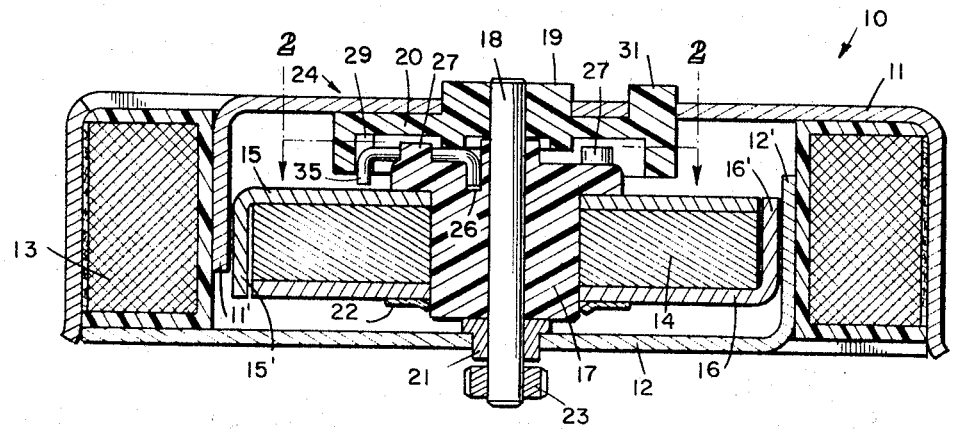
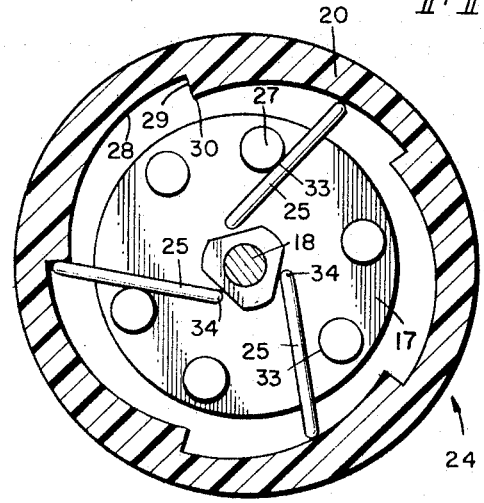
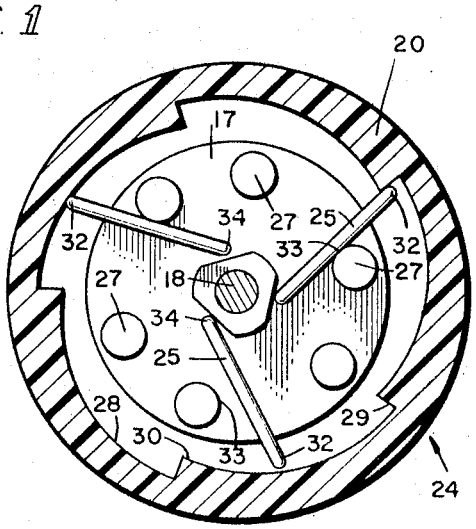
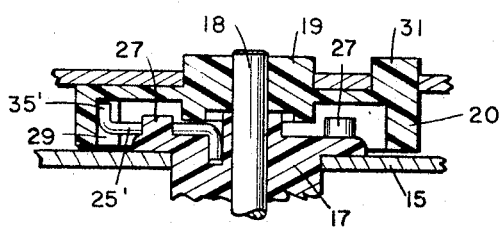
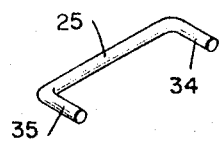
INVENTORS
RICHARD E. PERVORSE
JOSEPH E. WISER
JOHN A. PETERSON
STEPHEN F. MURRAY
BY
ATTORNEY United States Patent Office 3,448,308
Patented June 3, 1969

ABSTRACT OF THE DISCLOSURE

Spring wires are used to provide a mechanical stop against reverse rotation of a rotor as well as provide a resilient action to help the motor obtain synchronization at the quickest possible moment.

---

There are a multitude of applications for small synchronous motors of the type having a permanent magnet rotor. Many of these applications are in timing devices such as clocks and automatic washer time sequence switches.

One of the problems associated with synchronous motors having permanent magnet rotors is that the rotors will run in either a clockwise or counterclockwise direction when current is applied. Thus the motor drive shaft could be driven in a direction counter to what is desired. Such indiscriminate turning of the rotor is inherent in the structure of the motor itself. The asymmetry between the magnet, the coil used to energize the magnet, and the relationship of the stator poles inherently causes the rotor to turn in either a clockwise or counterclockwise direction.

The present invention is concerned with synchronous motors of the permanent magnet type and has as one of its objects the provision of a one-way directional device for controlling the direction in which the rotor will run.

Another object of the invention is to provide a one-way directional device for a synchronous motor which will aid the motor in obtaining synchronization at the quickest possible moment.

Another object of the invention is to provide a one-way directional device which is inexpensive, highly efficient, and durable.

A further object of the invention is to provide a one-way directional device for a synchronous motor wherein the direction of the motor output can be readily changed.

Still another object of the invention is to provide a one-way directional device for a synchronous motor which provides for a stop against reverse rotation of the rotor through a spring wire means.

Another object of the invention is to provide a one-way directional device for a synchronous motor wherein the spring wire means provides a resilient action to aid in quick synchronization of the motor.

Yet another object of the invention is to provide a one-way directional device for a synchronous motor wherein a plurality of spring wires are retained by a stationary race which is part of a molding employing ramp and stop means.

Other objects and the nature thereof will become apparent from the following description considered in conjunction with the accompanying drawings and wherein like reference numbers describe elements of a similar function therein and wherein the scope of the invention is determined by the appended claims.

In the drawings:
FIGURE 1 is a dead section of a typical synchronous motor employing the novel one-way directional device of the present invention;
FIGURE 2 is an enlarged cross section taken along line 2—2 of FIGURE 1 showing the one-way directional device;
FIGURE 3 is a view comparable to that of FIGURE 2, but showing a different operating position;
FIGURE 4 is a perspective view of one form of the spring wire means used in the one-way directional device;
FIGURE 5 is a perspective view of another form of the spring wire means; and
FIGURE 6 is a cross section of the one-way directional device showing the use of the spring of FIGURE 5.

Generally speaking, the objects of the invention are accomplished by providing a one-way directional system for a permanent magnet synchronous motor which utilizes a spring wire means to engage stop means so as to prevent further rotation of the rotor of the motor in the wrong direction. In addition means are provided to force the spring wire means to deflect as a beam after the spring has engaged the stop means such that the energy induced in the spring by the deflection aids in forcing the rotor to run in a counter direction, thus aiding in the quick synchronization of the motor.

More particularly, the objects of the invention are accomplished by providing a one-way directional device for a permanent magnet synchronous motor which in general comprises a stationary race which includes a plurality of ramps and stop means, a plurality of spring wire means pivotally retained by the stationary race and a plurality of cooperating boss means adapted to engage the spring wire means after the wire means has engaged one of the stop means.

Referring now to the drawings, and more particularly to FIGURE 1, there is shown a synchronous motor 10 employing the novel one-way directional system of the present invention. The motor is retained in a top shell 11 and the bottom shell 12 which are held together to form a housing. The material for the shells may be ordinary cold-rolled steel, preferably annealed. A plurality of integral stator poles 11' and 12' are formed by lancing radial strips out of the shells and forming them parallel to the center axis of the motor so as to extend above and below the rim of the shells.

A coil 13 consisting of an insulating spool wound with a predetermined number of turns of wire is annularly disposed in the space between the I.D. of the shells and the intermeshed ring of stator poles. For illustrative purposes, the coil 13 could have approximately 5000 turns of 40 AWG enameled copper wire terminated by insulated stranded wire.

The rotor of the motor is comprised of a permanent magnetic disc 14 sandwiched between two spiders 15 and 16 carried by hub 17 which is press-fitted to a plastic motor drive shaft 18. Each of the spiders have integral legs formed parallel to the center axis of the spiders so as to intermesh alternately with the legs of the opposite spider. The spiders can be formed of ordinary cold-rolled steel, preferably annealed. The permanent magnet disc 14 is magnetized so that one face is north and the opposite face is south. Thus, the spider legs are magnetized correspondingly so that the periphery of the rotor contains a predetermined number of salient motor poles magnetized alternately north and south.

Drive shaft 18 is rotatably journalled at the top of the motor through bushing 19, which is formed as part of the stationary race 20 of the one-way directional system, and at the bottom of the motor through bushing 21. A retaining washer 22 adds structural stability to the rotor with respect to the drive shaft. Pinion gear 23 transmits the rotation of the drive shaft to a load (not shown).

As noted previously, when the motor is first started, the rotor can "take off" in either a clockwise or counterclockwise direction due to the asymmetry between the coil, the magnet and the stator and rotor poles. In the present invention this problem has been solved by the one-way directional system 24. One-way directional system 24, in general, comprises stationary race 20, a plurality of spring wires 25 which are pivotally held at one end in corresponding holes 26 formed in hub 17, and a plurality of bosses 27 extending from hub 17. Stationary race 20 includes a plurality of ramp means 28 the ends 30 of which terminates abruptly to form stop means 29. The stationary race is heat staked by lugs 31 to the upper shell 11.

With particular reference to FIGURES 1, 2 and 3 the operation of the one-way directional systems can be described. When coil 13 is energized the rotor will turn in either a clockwise or counterclockwise direction. FIGURE 2 illustrates an embodiment of the invention wherein the motor is designed such that the rotor turns in a counterclockwise direction when the motor is in operation. Should the rotor "take off" in a clockwise direction, spring wire 25 will engage one of the stop means 29, the spring being forced out against the ramps by centrifugal force. This prevents further rotation of the rotor in the wrong direction. Additionally, the boss 27, immediately following the spring as it rotates, engages the spring wire causing it to deflect as a beam so as to induce sufficient energy in the spring to aid in forcing the rotor to turn in the opposite or correct direction. Thus, the one-way directional system of the present invention not only prevents incorrect rotation of the rotor, but it aids in the quick synchronization of the rotor in the proper direction. As the rotor turns in the proper direction the spring wires 25 ride over the ramps 28 of the stationary race.

The location of the spring wires 25 with respect to the bosses 27 is a critical feature of the present invention. More specifically, the spring wires should be able to pass over the ramps when the rotor is turning in the correct direction, and yet be able to stop against stop means 29 when the rotor is turning in the wrong direction without there being any tendency for the motor to become inoperative. For example, the spring wires could rather easily become wedged or jammed in the stop means 29. Generally speaking, the spring wires and their cooperating bosses should be such that the actuating end 32 of the spring and the working surface 33 of the boss are directionally in front of a line drawn through the pivot end 34 of the spring and the axis of the stationary race 20 as the rotor turns in a direction opposite the desired direction. As shown, the axis of the race and the rotor are concentric.

As shown in FIGURES 2 and 3, bosses 27 are disposed in pairs. With this arrangement the control direction of the system, or the desired direction of the output of the motor can be easily reversed. Thus as shown in FIGURE 3, by using the mirror image of the stationary race 20 and positioning the spring in front of the other boss of the pair in the manner previously noted, the system can be made to insure a clockwise rotation of the rotor. Alternatively, instead of a pair of bosses, a single boss or an island of sufficient arc length could be used.

FIGURES 4 and 5 illustrates two types of spring wires that can be used in the present one-way directional system. FIGURE 4 shows a U-shaped spring 25 which is also shown in FIGURE 1. FIGURE 5 shows a Z-shaped wire 25' which is also illustrated in FIGURE 6. Either of these two shapes can be used. The important consideration is that the spring have a bent portion 35 and 35' which engages the ramps 28 in order to insure a smooth contacting surface of the spring.

From the foregoing description taken in conjunction with the accompanying figures of the drawing, it will be readily apparent to those skilled in the art that this invention provides a new and improved one-way directional system for synchronous motors. Accordingly, it is contemplated that the scope of the invention is to be determined from the following appended claims.

What is claimed is:

1. A one-way directional system for a permanent magnet synchronous motor which comprises: a stationary race fixedly held to the housing of said motor, said race including ramp means terminating in stop means, a plurality of spring wires pivotally mounted on the rotor of said motor such that rotation of said rotor causes said spring wires to engage said ramp and stop means, and a plurality of cooperating bosses adapted to engage said spring wires when said wires engage said stop means.

2. In a one-way directional system for a synchronous motor having a permanent magnet rotor, a plurality of spring wires pivotally mounted on the hub of said rotor and a plurality of cooperating bosses extending from said hub, means to stop said wires when said rotor is turning in the wrong direction, said spring wires and their cooperating bosses being positioned such that the actuating end of said springs and the working surface of said bosses are directionally in front of a line drawn through the pivot end of said spring and the axis of said rotor as said rotor turns in a direction opposite the desired direction.

3. In a one-way directional system for a synchronous motor according to claim 2, wherein said bosses are additionally located in pairs.

4. In a one-way directional system for a permanent magnet synchronous motor wherein the directional rotation of the rotor can be stopped and reversed, a stationary race including ramp and stop means, a plurality of spring wires pivotally mounted on said rotor and a plurality of cooperating boss means extending from said rotor, said spring wires being adapted to engage said ramp and stop means when said rotor is turning, said spring wires and their cooperating bosses being positioned such that the actuating end of said springs and the working surface of said bosses are directionally in front of a line drawn through the pivot end of said spring and the axis of said rotor as said rotor turns in a direction opposite the desired direction.

5. In a one-way directional system for a permanent magnet synchronous motor according to claim 4 wherein said spring wires are U-shaped.

6. In a one-way directional system for a permanent magnet synchronous motor according to claim 4 wherein said spring wires are Z-shaped.

7. In a synchronous motor encased in a housing formed of upper and lower shells and having a permanent magnet rotor carried by a hub surrounding a centrally located motor drive shaft; a one-way directional system disposed within said housing comprising: a stationary race fixedly held by said upper shell and rotatably journalled on said drive shaft, said stationary race including a plurality of ramp means terminating in stop means, a plurality of spring wires pivotally mounted in said hub, rotation of said rotor causing the actuating end of said spring wires to ride against said ramp means, and a plurality of cooperating bosses extending from said hub, said bosses causing said spring wires to deflect as a beam when said wires engage said stop means.

8. In a synchronous motor according to claim 7, wherein said spring wires and their cooperating bosses are positioned such that the actuating end of said springs and the working surface of said bosses are directionally in front of a line through the pivot end of said spring and the axis of said rotor as said rotor turns in a direction opposite the desired direction.

References Cited

UNITED STATES PATENTS

| | | | |
|---|---|---|---|
| 3,122,666 | 2/1964 | Guiot | 310—41 |
| 3,225,874 | 12/1965 | Wooley | 310—41 X |
| 3,259,771 | 7/1966 | Rubin | 310—164 |

FOREIGN PATENTS 506,273  5/1939  Great Britain.

WARREN E. RAY, *Primary Examiner.*

U.S. Cl. X.R.

310—156, 164